(12) United States Patent
Amadori

(10) Patent No.: US 12,405,671 B2
(45) Date of Patent: Sep. 2, 2025

(54) SYSTEM AND METHOD FOR INVOLUNTARY USER COMMAND COMPENSATION ON AN INPUT DEVICE

(71) Applicant: Sony Interactive Entertainment Europe Limited, London (GB)

(72) Inventor: Pierluigi Vito Amadori, London (GB)

(73) Assignee: SONY INTERACTIVE ENTERTAINMENT EUROPE LIMITED, London (GB)

( * ) Notice: Subject to any disclaimer, the term of this patent is extended or adjusted under 35 U.S.C. 154(b) by 0 days.

(21) Appl. No.: 18/526,536

(22) Filed: Dec. 1, 2023

(65) Prior Publication Data
US 2024/0192778 A1 Jun. 13, 2024

(30) Foreign Application Priority Data
Dec. 7, 2022 (GB) .................................. 2218354

(51) Int. Cl.
*G06F 3/01* (2006.01)
*A63F 13/22* (2014.01)
(Continued)

(52) U.S. Cl.
CPC .............. *G06F 3/016* (2013.01); *G06F 3/011* (2013.01); *G06N 20/00* (2019.01); *A63F 13/22* (2014.09); *A63F 13/285* (2014.09)

(58) Field of Classification Search
CPC ........ G06F 3/016; G06F 3/011; G06F 3/0237; G06F 3/033; G06F 3/0238; G06F 3/0219; G06F 3/0338; G06F 3/017; G06F 1/1624; G06F 21/31; G06F 3/0383; A63F 13/22; A63F 13/28; A63F 13/42; A63F 13/422;
(Continued)

(56) References Cited

U.S. PATENT DOCUMENTS

2002/0158843 A1* 10/2002 Levine .................. G06F 3/0383 345/157
2005/0239524 A1* 10/2005 Longman ................ G06F 3/038 463/9
(Continued)

FOREIGN PATENT DOCUMENTS

EP 3936992 A1 1/2022

OTHER PUBLICATIONS

UK IPO Combined Search and Examination Report received in Application No. GB2218354.5, date of search May 30, 2023, in 6 pages.
(Continued)

*Primary Examiner* — Xuemei Zheng
(74) *Attorney, Agent, or Firm* — Kilpatrick Townsend & Stockton LLP (57) ABSTRACT

There is described a computer-implemented method for involuntary user command compensation on an input device, the method comprising; receiving a user command from at least one input source of an input device; determining whether the user command is an involuntary user command; if it is determined that the user command is an involuntary user command, applying a compensation action to the user command; and issuing a compensated user command output based on the compensation action. There is also described a computer program product and a system.

18 Claims, 4 Drawing Sheets

(51) Int. Cl.
*A63F 13/285* (2014.01)
*G06N 20/00* (2019.01)

(58) Field of Classification Search
CPC ............ A63F 13/285; A63F 2300/1018; A63F 2300/10; A63F 2300/6045; G06N 20/00
See application file for complete search history.

(56) References Cited

U.S. PATENT DOCUMENTS

| | | | |
|---|---|---|---|
| 2011/0074691 A1* | 3/2011 | Causey | G06F 3/016 345/169 |
| 2012/0056848 A1* | 3/2012 | Yamano | G06F 3/0414 345/174 |
| 2013/0288777 A1 | 10/2013 | Short et al. | |
| 2015/0185850 A1* | 7/2015 | Guilak | G06F 3/017 345/156 |
| 2017/0228025 A1 | 8/2017 | Hall et al. | |

OTHER PUBLICATIONS

Extended European Search Report received in Application No. EP23214613.4, dated Mar. 18, 2024, in 8 pages.

\* cited by examiner

SYSTEM AND METHOD FOR INVOLUNTARY USER COMMAND COMPENSATION ON AN INPUT DEVICE

CROSS-REFERENCE TO RELATED APPLICATIONS

This application claims priority to United Kingdom Patent Application No. GB2218354.5, filed Dec. 7, 2022, the contents of which are incorporated herein by reference.

FIELD OF THE INVENTION

The present invention relates to a computer-implemented method for involuntary user command compensation on an input device. The present invention also relates to a computer program product and a system.

BACKGROUND TO THE INVENTION

A user can provide commands to an electronic device, such as a video game console, using an input device, such as a handheld console or controller. The user is able to operate the electronic device via the buttons, joysticks or analogue sticks, touch pads and other input sources of the input device.

However, medical conditions, disabilities and other factors can impact or impair motor skills and cause challenges for the user of the input device. For example, the user may have uncontrollable hand movements and provide involuntary commands to the input device such as an involuntary press or release a button or jerky movement of the joystick or analogue stick. In such cases, the user can become frustrated that their involuntary commands are actioned by the electronic device.

It is desirable to improve accessibility of input devices, thereby improving the ease with which a user with impacted motor skills can operate the electronic device.

Objects and aspects of the present claimed invention seek to alleviate at least these problems with the prior art.

SUMMARY OF THE INVENTION

According to a first aspect of the invention, there is provided a computer-implemented method for involuntary user command compensation on an input device, the method comprising; receiving a user command from at least one input source of an input device; determining whether the user command is an involuntary user command; if it is determined that the user command is an involuntary user command, applying a compensation action to the user command; and issuing a compensated user command output based on the compensation action.

The first aspect provides a method for improving use of an input device by issuing a compensated user command output in response to involuntary commands input by a user.

In some embodiments, the compensated user command output may comprise force-feedback and/or soft-feedback. Force-feedback may comprise applying an active compensation action, such as an adaptive force applied to a physical aspect of the input device, for example an input source of the input device. The adaptive force can actively inhibit or modify the user command while is it being received. Soft-feedback may comprise applying a passive compensation action. Optionally, the soft-feedback occurs after receipt of the user command. The passive compensation action may not actively inhibit or modify the user command. Optionally, both force-feedback and soft-feedback may be applied simultaneously.

In some embodiments, the force-feedback may comprise modifying the input device by inhibiting motion of a portion of the input device in response to a user force. Optionally, inhibiting motion of a portion of the input device may comprise increasing resistance of one or more input sources of the user device against a user force. Optionally, inhibiting motion of a portion of the input device may comprise increasing the user force required to repeat the user command on the input device.

In some embodiments, motion may be inhibited for a predetermined period of time. Optionally, the predetermined period of time may be determined by receipt of a subsequent user command. Optionally, the subsequent user command may be a different user command from the initial user command.

In some embodiments, inhibiting the motion may comprise increasing the resistance of the input device against a user force. Optionally, inhibiting the motion may comprise preventing actuation of at least a portion of the input device.

In some embodiments, the method may comprise receiving at least one prior user command from at least one input source of the input device, receiving a subsequent user command and determining the subsequent user command is an involuntary user command based on the at least one prior user command. Optionally, the subsequent user command may be a different user command from the prior user command. Optionally, the at least one prior user command is compared to a series of prior user commands and the subsequent user command is determined to be an involuntary user command if the at least one prior user command matches the series of prior user commands.

In some embodiments, the soft-feedback may comprise modifying or ignoring the involuntary user command. Optionally, modifying or ignoring may comprise; inputting the user command to a machine learning model; predicting a desired user command; calculating a deviation of the user command from the predicted desired user command; and outputting a compensation recommendation based on the deviation.

In some embodiments, determining whether the user command is an involuntary user command comprises inputting the user command to a machine leaning (ML) model trained to estimate whether the input sources of the input device have been actuated unintentionally and/or intentionally. The ML model may estimate whether the input sources of the input device have been actuated unintentionally and/or intentionally by: calculating a deviation of the user command from the predicted desired user command; and outputting a compensation recommendation based on the deviation. Optionally, determining whether the user command is an involuntary user command may comprise; inputting the user command to a machine learning model; predicting a desired user command; calculating a deviation of the user command from the predicted desired user command; and outputting a compensation recommendation based on the deviation. Optionally, the computer-implemented method may comprise modifying the compensation action in response to the compensation recommendation. Optionally, modifying the compensation action in response to the compensation recommendation may occur prior to applying the compensation action.

In some embodiments, the computer-implemented method may further comprise storing the user command on a memory, the memory comprising data related to at least one user command output or at least one user command input. Optionally, the computer-implemented method may further comprise storing the user command and the determination on a memory, the memory comprising data related to at least one user command output or at least one user command input.

In some embodiments, the computer-implemented method may further comprise learning user behaviours comprising; one or more prior user command inputs and/or one or more prior user command outputs and/or compensated user command outputs. Optionally, learning user behaviours may comprise one or more of; a machine learning model, artificial intelligence, and an artificial neural network.

In some embodiments, the computer-implemented method may further comprise, prior to applying the compensation action, modifying the compensation action in response to one or more prior user command outputs and/or compensated user command outputs.

In some embodiments, the input device may be a console configured to send a signal to an electronic device. Optionally, the input device may comprise a plurality of input sources configured to receive a user command. Optionally, at least one input source of the device may be a button, analogue stick, joystick type button, touch pad, trigger or other object configured to receive a user command. Optionally, the electronic device may be a video game console. Optionally, the electronic device may be a computing device.

In some embodiments, the computer-implemented method may further comprise a calibration step prior to receiving a user command, wherein the calibration step comprises: providing a predetermined calibration task to a user; receiving user data in response to the calibration task; and processing the user data to determine a baseline deviation from a threshold. Optionally, the threshold may comprise a predetermined expected input. Optionally, the threshold may comprise a predetermined expected output. Optionally, the threshold may comprise user data from a prior calibration task.

In some embodiments, the calibration task may comprise issuing user command instructions to be executed by the user. Optionally, the calibration step may occur during a preliminary period occurring prior to normal use of the electronic device. Optionally, user data and/or the baseline deviation may be stored on the memory.

In some embodiments, applying a compensation action to the user command may comprise modifying the compensation action in response to the baseline deviation of the user command.

In some embodiments, the compensation action defines an instruction to compensate for the user command or a future user command. For example, the compensation action may be an instruction to modify a physical aspect of the input device to anticipate a future involuntary user command, or an instruction to ignore or offset the user command.

In some embodiments, applying a compensation action to the user command may comprise assigning a compensation value to the user command. Optionally, the compensation value is a binary value. Optionally, the compensation value may indicate a level of compensation required in the compensated user command output. Optionally, the assigned compensation value may be stored on the memory.

According to a second aspect of the present invention, there is provided a computer program product including one or more executable instructions which, when executed by a computer, causes the computer to carry out the method of the first aspect of the invention.

According to a third aspect of the present invention, there is provided a system comprising: a processor configured to implement the method steps according to of the first aspect of the invention; a memory; an input device; and a display device.

BRIEF DESCRIPTION OF THE DRAWINGS

Embodiments of the present invention will now be described by way of example only and with reference to the accompanying drawings, in which.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

The present disclosure provides a method for improving use of an input device by issuing a compensated user command output in response to involuntary commands input by a user. Involuntary or unintentional commands can be detected, allowing for compensation of the involuntary command. In particular, the method of the present invention may address some of the disadvantages and frustrations that users with impacted motor function and control have when using an input device, such as a video game console. A compensation action comprises an action which seeks to compensate, offset or otherwise alleviate the impact caused by involuntary user command.

Impacted motor function may be caused by a permanent or temporary medical condition, injury, disability or other factor affecting the user's motor function. For example, impacted motor function may be caused by a tic, hand or arm tremor, loss of a hand or one or more fingers, broken bone or other injury, condition affecting the muscles, impacted vision, arthritis, conditions affecting the nervous system and/or loss of function in one or more parts of the body (e.g. the user's fingers). In some instances, the motor function of the user may be impaired but in other cases only one or more tasks may be more challenging due to the impacted motor function.

Figure 1:
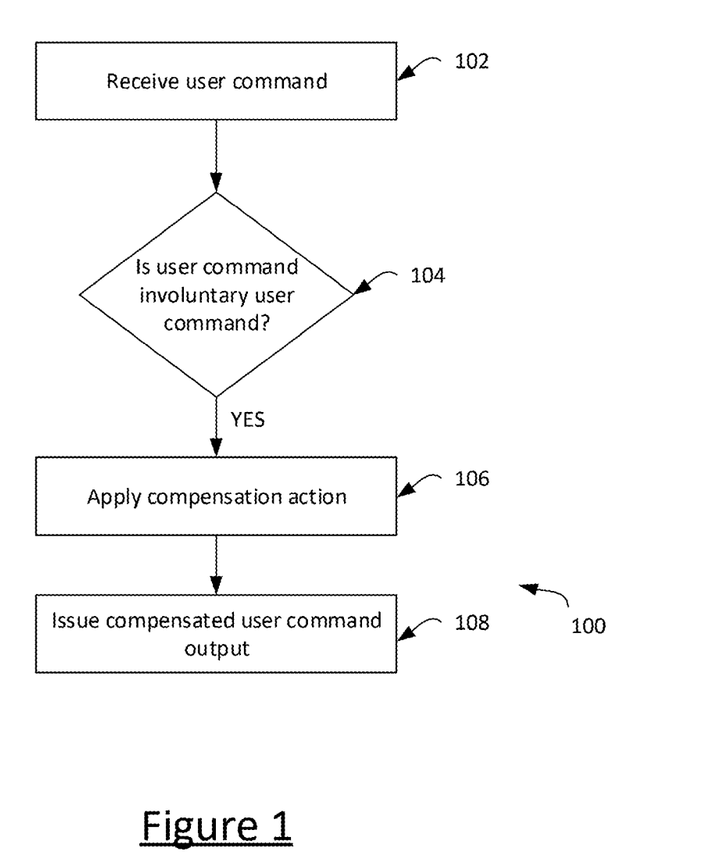
FIG. 1 depicts a flow diagram of a method according to an embodiment of the first aspect of the present invention.

With reference to FIG. 1, a flow diagram of a method 100 according to the first aspect is provided.

In step 102, a user command is received from at least one input source of an input device. A user command is a user input provided by user interaction with at least one input source. When the user command is received by the input device, an output is triggered comprising sending a signal to a processing device. For example, the user may press a button, e.g. a "start" button, on the input device (a user command) which causes gameplay to be paused within a video game scenario (the output). This command may or may not be a voluntary command.

In the following description, the electronic device may comprise a video game console and the input device may comprise a handheld or wearable console configured to send a signal to the video game console. It is understood that the electronic device may be any suitable device such as a computing device or media player. The input device may also be any suitable device, such as a headset, keyboard, mouse, controller, trackpad, joystick, mobile phone screen or other handheld or wearable device.

A common input device for an electronic device, such as a video game console, is a handheld and hand-operated controller or console, mouse or joystick. Consoles often comprise buttons and joysticks, located close together, which are sensitive to user force and hand movements. As such, small hand movements can cause unwanted inputs and commands to be issued to the console. Users with impacted motor skills may therefore find it challenging to operate a console. Examples of involuntary user commands include involuntary release of a button due to impaired strength of a user's hand and accidental actuation of the buttons, joystick or touchpad due to regular and/or random uncontrollable hand movements.

The input device may be a handheld controller or wearable device configured to send a signal to a video game console, such as a DualShock 4 ®, a PS VR® headset or a PS Move® Controller. In this way, the user can issue commands to the input device by pressing, moving and/or touching one or more of the plurality of input sources, such as a button, trackpad or joystick/analogue stick on the controller. When an input command is received by the controller, a signal is sent to the video game console to operate the console or to control gameplay.

In step 104, it is determined whether the user command is an involuntary user command. Involuntary user commands (e.g. unintended or accidental inputs) may be issued more frequently by user's with impacted motor skills, such as user's experiencing uncontrollable hand tremors or localised muscle weakness.

In some embodiments, determining whether the user command is an involuntary user command may comprise a machine learning (ML) model. For example, the user command may be input into a ML model. There may follow the steps of predicting a desired user command; calculating a deviation of the user command from the predicted desired user command; and outputting a compensation recommendation based on the deviation. For example, the predicted desired user command may be an alternative command to the user command or that no command is received. The ML model is trained to estimate whether the inputs to the input device have been actuated voluntarily or accidently (e.g. unintentionally). The desired user command can be accurately predicted and an accurate compensation recommendation can be issued.

The ML model could be used to predict or determine one or more of the following; whether the user has a particular pattern of behaviour that corresponds to a specific condition or disability affecting motor skills; whether a command is voluntary or involuntary command; or a predicted intended or desired user command.

A large deviation from the predicted desired user command could indicate that the user is not acting as predicted and the command input may be unintentional (e.g. not desired). Therefore, a large deviation could indicate the user command is an involuntary user command. Calculation on no or a small deviation from the predicted desired command could indicate the user command input is intentional as the user is acting in the manner predicted by the ML model. Therefore, determining that there is no (or a small) deviation from the predicted user command indicates the user command is a voluntary command. Optionally, determining whether the user command is an involuntary user command comprises monitoring whether the deviation of the user command from the predicted desired user command exceeds a predetermined threshold.

In step 106, if it is determined that the user command is an involuntary user command, a compensation action is applied to the user command. The compensation action applies instruction that an uncompensated user command output is issued. If it is determined that the user command is not an involuntary user command, namely that it is a voluntary command (e.g. an intended input command), no compensation action is applied to the user command input.

A compensation action may comprise instructions for the user command to be ignored, filtered or modified (e.g. soft-feedback) or instructions for physical aspects of the input device, such as the input sources, to be modified, such as increasing resistance of a button on the input device (e.g. force-feedback). Optionally, the method 100 further comprises modifying the compensation action in response to the compensation recommendation prior to applying the compensation action. In this way, the compensated user command output reflects the prediction and accurate compensation recommendation output of the ML model of Step 104.

In step 108, a compensated user command output is applied to the user command input based on the compensation action. The compensated user command output is the output in response to the user command input.

As an example of the application of step 106 and step 108, the user command input may be the press of a 'pause' button on the input device, thereby instructing the electronic device to pause gameplay. If it is determined that the command is an intended input command (i.e. that the user intended to pause gameplay), no compensation action is applied to the user command input and the command to pause gameplay can be actioned. As no compensation action has been issued in Step 106, no compensated user command output is applied to the user command input in Step 108. Therefore the electronic device pauses gameplay as instructed by the user.

If it is determined that the user command to pause gameplay is an involuntary user command (i.e. the user did not intend to pause gameplay), a compensation action is applied to the user command in Step 106. For example, a compensation action by force-feedback or soft-feedback. Force-feedback may comprise an adaptive force applied to a physical aspect of the input device, for example an input source of the input device. This adaptive force can actively inhibit or modify the user command while is it being received. Soft-feedback may comprise applying a passive compensation action after receipt of the user command. The passive compensation action may not actively inhibit or modify the user command.

In one example, the compensation action comprises instructions to issue a compensated user command output comprising force-feedback. In such cases, the input device may adapt to guide and counteract undesired inputs, movements and button presses. The input device may make buttons stiffer or harder to press or, for example, undesired joystick-based commands could be smoothed out by ensuring that actuation or movement of the input source (e.g. the joystick) is only possible in one or more specific directions. For instance, resistance to motion of a joystick-type button in the vertical directions may be increased, thereby allowing only horizontal movement of the joystick-type button. It is understood that force-feedback may be applied to any one or more input sources (e.g. buttons) simultaneously.

Motion of the input source may be inhibited for a predetermined period of time. For example, if the user repeatedly but unintentionally knocks a joystick-type button to the right, motion of the joystick to the right may be inhibited by the input device until an alternative user command is received (i.e. a user command that isn't a force on the joystick to the right). Repeated accidental commands on the input device, such as commands caused by a hand tremor, can be prevented from occurring. Inhibiting the motion may comprise increasing the resistance of the input device against a user force. In this way, it is more challenging for the user to actuate the button and/or analogue stick of the input device, and so the risk of unintentionally actuating the button and/or analogue stick is reduced. The method compensates for involuntary user commands by offsetting the command or inhibiting the command from occurring or occurring again.

In the above example, the force-feedback of Step 108 may comprise increasing resistance of the 'pause' button, such that the button requires a greater user force to press down. In this way, it is harder for an unintentional hand motion to action the button, and the unintentional user command is less likely to be issued. As such, only intentional user commands will overcome the resistive forces to actuate the button.

Alternatively or additionally, the compensation action of Step 106 may comprise instructions to apply soft-feedback to the received user command to pause gameplay. Errors due to accessibility challenges and impacted motor functions are often characterised by a pattern of behaviour which is typical to that accessibility challenge or the individual user. The machine learning model can be trained to recognise these patterns and recognise user errors from errors caused by involuntary player commands.

Unlike force-feedback, soft-feedback does not guide, inhibit or prevent a user command from being issued and instead passively applies the compensation action, such as by applying a compensation action comprising instructions to ignore the user command after it is received. In the case where the compensated user command output comprises soft-feedback, commands received by the input device are "filtered" (e.g. ignored) or "modified" (e.g. corrected) in order to comply with the player's intent estimated by the ML model of Step 104.

If the compensated user command output of Step 108 comprises soft-feedback, the user command may be ignored and gameplay, in the above example, is not paused. In this way, the compensated user command output passively offsets the involuntary user command by preventing the involuntary user command from being actioned after the involuntary user command is received at the processing device.

The user may be presented with an option to select whether they wish the method of the present invention to be applied while they operate the electronic device, for example at the beginning of a game or other extended interaction with the input device and connected computing device. For example, the method may be advantageous for a user experiencing impacted motor function, such as hand tremors. A method of continuously or selectively monitoring the commands sent by the user is provided. Intervention occurs in real-time when involuntary user commands are received. Real-time detection and intervention is advantageous in enabling users with accessibility needs to more successfully operate the input device, reducing user exclusion and frustration.

Figure 2A:
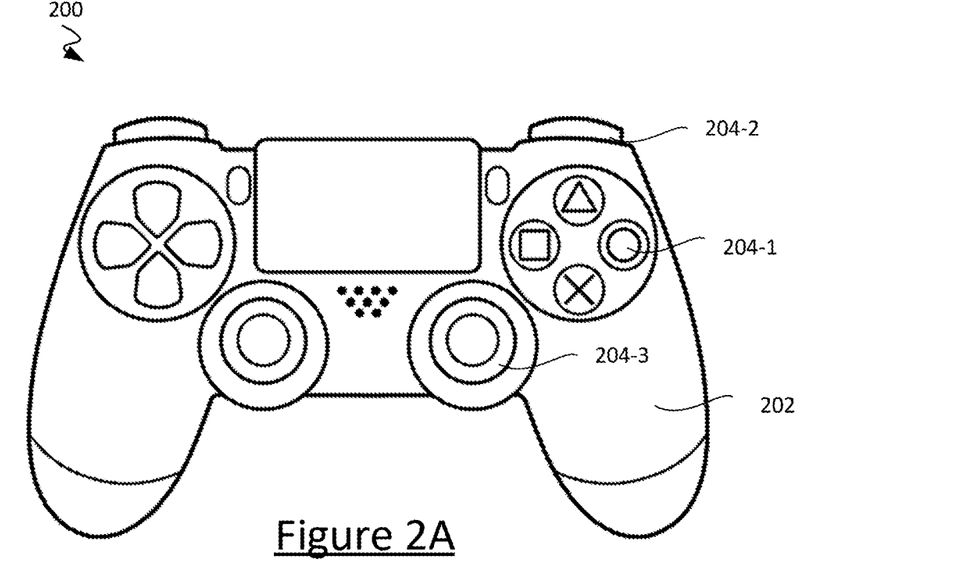
FIGS. 2A and 2B illustrate diagrams of an example input device in accordance with the present invention.

With reference to FIG. 2A, an input device comprising a handheld controller 200 is depicted. The controller 200 is configured to send a signal to an electronic device comprising video game console. The controller 200 may be connected to the video game console via any suitable connection, such as a wireless or wired connection.

The controller 200 comprises a plurality of input sources. The input sources may be programmed to each generate an input to a virtual world (e.g. a video game on the video game console) or to operate the console. As an example, pressing a button may have a function that will result in an action of a character (e.g. avatar) in a game (e.g. jump, kick, roll, etc.). Movement of the joystick type buttons may correspond to movement of the character (or avatar) in the game (e.g. walking or running) in a direction controlled by the positioning of the joystick. For example, when the user presses a right arrow button on the controller, this may issue an instruction to scroll to the right of a displayed list on the console or to command a character within a video game scenario to move to the right.

The controller 200 has two handle portions 202 for being held by two hands of a user. Round push buttons 204-1 are arranged on the right-hand side of the controller 200 and are generally arranged to be pushed or pressed by a user's right thumb. A collection of non-round push buttons is also arranged on the left-hand side of the controller 200, usually arranged to be pressed by a user's left thumb. A further pair of push-type buttons 204-2 are arranged at left- and right-hand portions at the rear of the controller 200 when held by a user. These buttons are operated by the fingers of the left- and right-hands of a user, for example by a left or right index finger of the user respectively. Two joystick type buttons 204-3 are located proximate the handle portions of the input device 202 on a left- and right-hand side of the input unit 202 and can be operated by a user's left or right thumb respectively. The joystick type buttons 204-3 have movement around an axis of rotation and can be operated by being pushed forwards, backwards, to the sides and/or around in a clockwise or anti-clockwise motion.

Functions, instruction signals and arrangement of the inputs sources of the input device is highly variable depending on the input device itself, the virtual world or video game that the user is interacting with. The above-described input options 204-1, 204-2, 204-3 should not be understood as limiting the scope of the present disclosure. In some examples, the input device may be a keyboard or other type of games console.

Figure 2B:
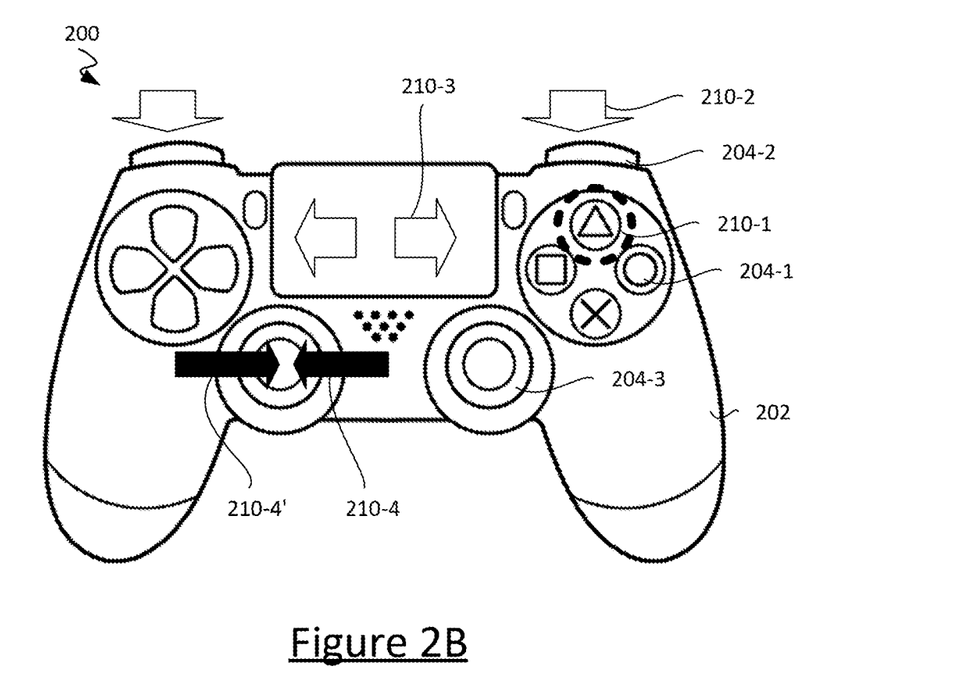

FIG. 2B illustrates how force-feedback may be issued by the controller 200 of FIG. 2A. Images of arrows 210-2, 210-3 may for example indicate a location of buttons 204-2 to be pressed in the context of the virtual environment (e.g. during a video game).

A user with impacted motor skills may, for example, have a left hand tic such that the user's left hand has a tendency to accidently apply an input force 210-4 to the left physical joystick type button 204-3 in the left direction. The method of the present invention may receive the input force 210-4 and determine that the input force 210-4 is an unintentional user command (e.g. an accidental input force). A compensation action may be applied to the input force 210-4 (i.e. the user command) comprising instructions to the controller 200 to apply force-feedback.

A compensated user command output is issued based on the compensation action. Namely, the controller 200 applies a counter force 210-4' to the left physical joystick type button 204-3, thereby increasing the resistance of the left physical joystick type button 204-3 to motion in the left direction. The counter force 210-4' inhibits the user accidently moving the left physical joystick type button 204-3 in the left direction, thereby compensating for their left hand tic.

Similarly, the compensation action applied to the input force 210-4 (i.e. the user command) may be instructions for the controller 200 to apply soft-feedback instead of or in addition to the force-feedback. The input force 210-4 to the left physical joystick type button 204-3 in the left direction may issue instructions for the user's character in the virtual environment (e.g. a video game) to move in the left direction of the screen. Instead of issuing the instructions for the character to move in the left direction, the compensated user command output may be to ignore the input force 210-4 (i.e. the user command). In this case, the instructions accidently issued by the user's unintentional command are not actioned.

In another example, a different or a same user may struggle to apply a push force 210-1 to one of the round push buttons 204-1, leading to instances where the round push button 204-1 is accidently released when the user intends on holding down the round push button 204-1. In instances when the user accidently releases the round push button 204-1, the user may quickly reapply the push force 210-1 to correct the unintentional release. In this case, the method could identify the removal of the push force 210-1 as an involuntary user command, for example using ML and applying a soft-feedback technique. The compensation action may therefore comprise instructions for the compensated user command output to comprise soft-feedback. For example, the issued a compensated user command output may be to ignore removal of the push force 210-1 (i.e. the user command to release the round push button 204-1).

Soft-feedback may be applied for a pre-determined period of time. In this example, the user may intentionally have released the round push button 204-1. Therefore, if no further push force 210-1 (user command) is received within a predetermined period of time (e.g. the user does not quickly reapply the push force 210-1 to correct the unintentional release), then the soft-feedback, namely the instructions to ignore the release of the round push button 204-1 are terminated.

Similarly, the compensation action may comprise instructions for the compensated user command output to additionally or alternative comprise force-feedback. For example, the controller 200 may comprise a slow-release feature wherein the round push button 204-1 does not immediately return from the first pressed state to the second released state. Instead, the round push button 204-1 slowly returns to second released state, thereby allowing the user time to reapply the push force 210-1 to the round push button 204-1 before the controller 200 registers that the round push button 204-1 has been released (e.g. when the button returns to second released state). In this way, when the user reapplies the push force 210-1, no second user command is issued as the controller 200 considers the round push button 204-1 is already in the first pressed state.

In some embodiments, soft-feedback is more appropriate than force-feedback and vice versa. For example, if an unintentional user command is repeated or predictable then force-feedback may be advantageous to physically prevent the user, or guide them away, from issuing or repeating the unintentional user command. However, if the unintentional user command occurs randomly then soft-feedback (e.g. ignoring the command) may be preferable.

In another example, the push force 210-1 may be an unintentional push force applied to a round push button 204-1. It may be determined that the push force 210-1 is an unintentional user command (e.g. accidental) and a compensation action can be applied to the push force on button 210-1. For example, the compensation action may comprise instructions to ignore the push force, thereby mitigating the involuntary user command to action the instruction caused by pressing the button.

Figure 3:
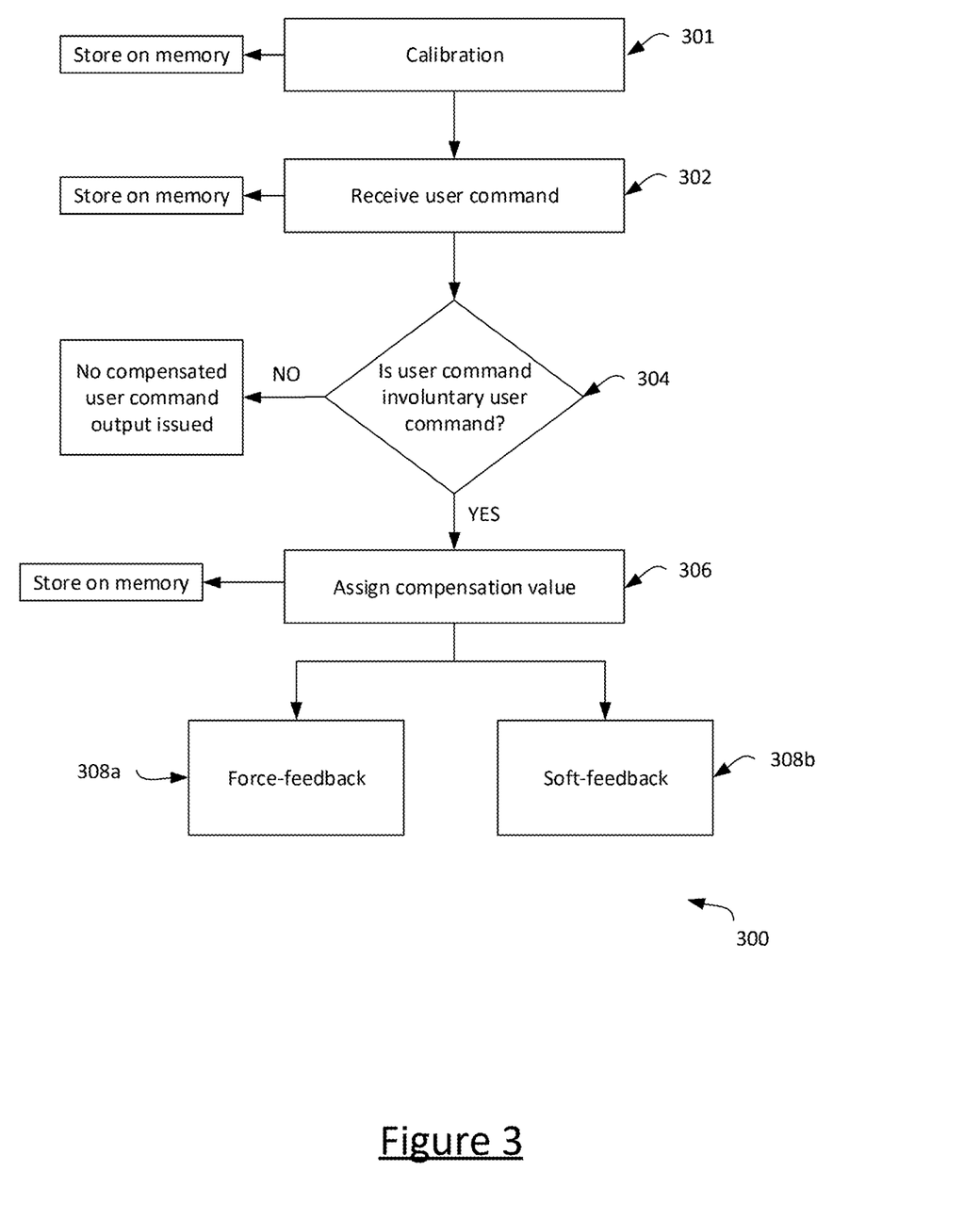
FIG. 3 depicts a schematic diagram of a system in accordance with the present invention.

With reference to FIG. 3, a flow diagram according to an embodiment of a method 300 is illustrated. Step 302 and step 304 are similar to step 102 and step 104, respectively.

Namely, in Step 302, a user command is received from at least one input source of the input device. Optionally, data regarding the user command is stored on a memory. Optionally, the memory is local or external to the input source and/or electronic device. For example, the memory may be located on a distributed or cloud server.

In Step 304, it is determined whether the user command is an involuntary user command, for example, using techniques described in relation to Step 104 above. Optionally, if it is not determined that the user command is an involuntary user command, then no compensated user command output is issued.

If it is determined that the user command is an involuntary user command, in Step 306 a compensation action is applied to the user command.

Optional Step 301 is a calibration step occurring prior to receiving a user command in step 302. Calibrating may be helpful to determine user specific challenges. The calibration step comprises providing a predetermined calibration task to a user; receiving user data in response to the calibration task; and processing the user data to determine a baseline deviation from a threshold. Each task may have a 'desired' or 'accurate' response expected from the user. For example, a series of user inputs may be expected to be received in response to instructions to provide a series of user inputs in an instructed order (e.g. push the joystick to the left, push the joystick to the right, push the joystick up and then push the joystick to the down). As such, the user data in response to the calibration task can be compared to the 'accurate' or expected input such that the baseline deviation is the error deviation from the 'accurate' response. Optionally, the threshold may comprise user data from a prior calibration task, for example as completed by a user previously. If the calibration is repeated, the baseline deviation could reflect whether the user is issuing more or less unintentional user commands, or different unintentional user commands than during prior completion of a calibration task. Optionally, user data and/or the baseline deviation is stored on the memory. As such, data received and outputted during optional Step 301 can be recalled such as to be used as an input into a ML model. For example, the baseline deviation may be inputted into the ML model to train the model. The baseline deviation is based on processing the user data from the optional calibration step 301. As such, the user data from the calibration task can train the ML model thereby improving the accuracy of the model outputs. Further, the data stored on the memory may be used to retrieve accessibility data regarding a particular user. Such a feature is beneficial, for example, when a number of users are associated with an electronic device.

Optionally, the calibration task may comprise issuing user command instructions to be executed by the user. The user command instructions may be a set of input instructions, such as a series of button presses or a task to follow which involves user actuation of one or more input sources of the input device. In this way, it can be determined whether the instructions have been followed accurately, thereby enabling detection of unintentional user commands where instructions were not followed. The calibration step can occur prior to use of the electronic device, such as prior to game play on a video game console, such that the baseline deviation is determined prior to use of the electronic device.

Optionally, user data and/or the baseline deviation stored on the memory is an input into the ML model of the determining step. Calibration is useful because the data stored on the memory can be used to more accurately assess the user's accessibility requirements based on the baseline deviation determined, as the 'desired' or 'expected' user inputs to the calibration task are pre-set.

Prior to normal operation of the input device, such as prior to gameplay, a user may be provided with a series of simple gameplay-based tasks during the calibration step of optional Step 301. For example, the gameplay-based tasks may include instructions to follow a character, complete in-game tasks (e.g. hit a target) or grab and hold a specified button. The calibration step does not need to be specific to the use of the input device (i.e. does not need to be specific to the intended video game) and can instead be specific to the input device and input sources. The calibration step identifies a baseline of the user's behaviour and can characterise the predominate accessibility challenges that affect the user's use of the input device.

For example, a new user on the electronic device may first undertake optional Step 301, with the user data and baseline deviation saved to a memory. The baseline data aids in identifying the accessibility challenges for the user, such that they are prone to accidently actuating one of the input sources, such as a button on the console. After the calibration step, the method can anticipate the user's tendency to actuate the button thereby ensuring future compensated user output commands better predict the intended input commands of the user.

In step 306, applying a compensation action to the user command comprises assigning a compensation value to the user command. Optionally, the assigned compensation value is stored on the memory. Compensation commands may be stored in the memory for later recall, or for providing data to be used in training and/or improving ML models. In this way, the memory may comprise historic data, such as historic user command outputs and compensation values and commands.

Optionally, applying a compensation action to the user command comprises assigning a compensation value to the user command. For example, the compensation value may be a value between 1 and 5, wherein a compensation value of 1 indicates mild compensation to the user command is required and a compensation value of 5 indicates high compensation to the user command is required than to a user command assigned with a value of 1. For example, the stiffness or resistance of an input source (e.g. a button or joystick) may be increased when a compensation value of 1 is assigned. When a compensation value of 5 is assigned, motion of the input source may be entirely inhibited. It is envisaged that the resistance to motion increases linearly for each compensation value between 1 and 5.

For example, an involuntary user command may be received wherein a joystick type button is pushed in a first direction. If a compensation value of 1 is assigned, the compensated user command output may be that the input device increases the resistance of the joystick against forces in the first direction. If the received user command offsets the joystick button further in the first direction, a compensation value of 3 may be assigned and the compensated user command output may be that the input device entirely inhibits motion of the joystick in the first direction. If the force of the user involuntarily command is significant, and the joystick is displaced the maximum distance in the first direction, a compensation value of 5 may be assigned to the user command. The compensated user command output may be that the input device inhibits motion of the joystick in the first direction and the input device may guide the joystick in the opposing direction when a user force is applied pushing the joystick in the first direction.

It may be that the user is providing an intentional user force to the joystick (e.g. they wish to push the joystick in the first direction). In such cases, the force-feedback may be time limited (e.g. a second or a fraction of a second) such that the sustained force applied to the joystick is registered as an intentional or desired user command. In such cases, there may only be a very short lag between the user issuing the command (e.g. pushing the joystick) before the joystick is released (e.g. motion is no longer inhibited and the joystick moves in the pushed direction). Thereafter, the user command can be actioned.

Additionally, if the same user command (e.g. pushing the joystick in the first direction) is repeated or is repeated within a predetermined period of time, this may indicated the user command is an intentional (e.g. not involuntary) command. In such cases, optionally, the method may comprise receiving at least one prior user command from at least one input source of the input device, receiving a subsequent user command and determining the subsequent user command is an involuntary user command based on the at least one prior user command. Optionally, receiving a subsequent user command comprises receiving the subsequent user command within a predetermined period of time after receipt of the at least one prior user command.

The prior user command may be the command to move the joystick in the first direction. The subsequent user command may be that 2 seconds later the joystick is again forced in the first direction. It may be determined that the prior and the subsequent user commands are intentional (e.g. not involuntary user commands) and so the compensation action may be instruction to take no action and allow the instruction relating to motion of the joystick in the first direction to be actioned. Therefore, in the unlikely case that the prior user command is incorrectly determined to be an involuntary user command and a subsequent compensated user command output is issued, the correct user command output is quickly issued.

Such a feature further enables patterns in the user's control of the input device to be used to determine whether a command is an involuntary user command. Such a feature is particularly advantageous for user's with impacted motor actions which are triggered by intentional commands to the input device, such that a recognisable pattern of involuntary commands is present.

The level of compensation applied in the step of applying a compensation action to the user command is determined by the assigned compensation value.

Optionally, applying a compensation action to the user command may comprise modifying the compensation action in response to the baseline deviation to the user command, determined in optional Step 301. In this way, the baseline calibration is considered during compensation of the involuntary user command, thereby anticipating the involuntary user command before it is received.

Optionally, applying a compensation action to the user command may comprise assigning a binary compensation value to the user command. In this way, the binary value can indicate whether the user command is 'voluntary' or 'involuntary'. In this way, the compensated user command output reflects the nature of the user command.

In step 308a, the compensated user command output may comprise force-feedback applied to a physical input source of the input device, such as in the examples outlined above. In step 308b, the compensated user command output comprises soft-feedback, wherein commands received by the input device are "filtered" (e.g. ignored) or "modified" (e.g. corrected), such as in the examples outlined above. Optionally, both force-feedback and soft-feedback may be applied simultaneously, thereby further tailoring use of the input device to the user's specific accessibility needs.

Figure 4:
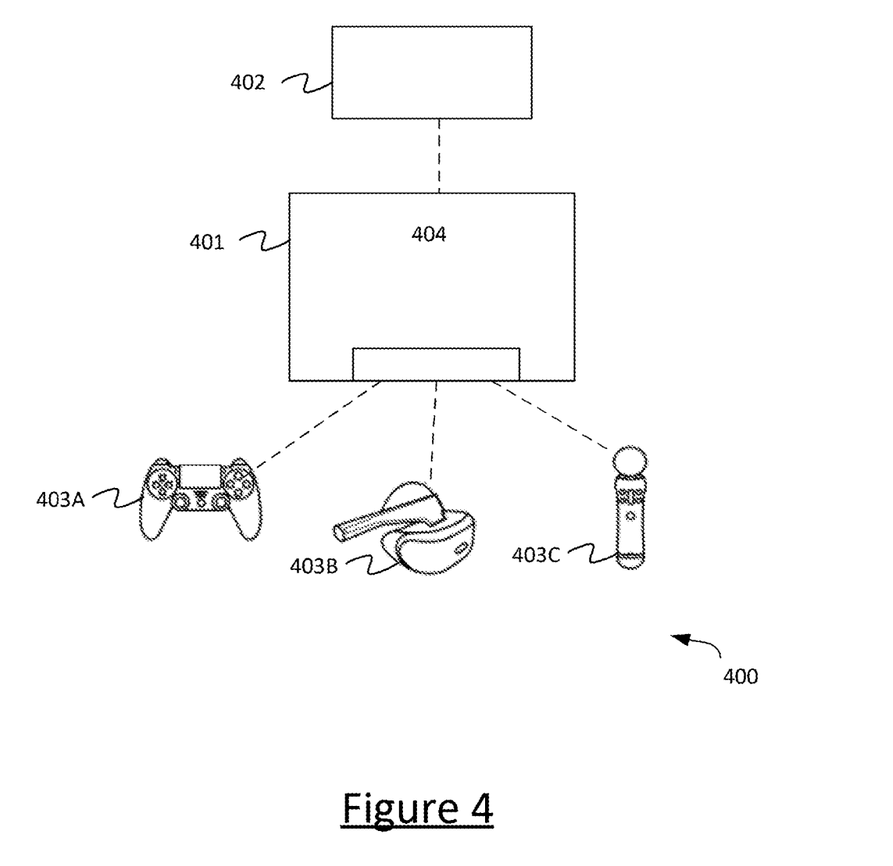
FIG. 4 depicts a flow diagram of a method according to a further embodiment of the first aspect of the present invention.

FIG. 4 shows schematically an example of a video gaming system 400 that may be used in accordance with the present disclosure. In FIG. 4, the video gaming system 300 is shown as comprising an electronic device 401, a cloud memory 402 and a plurality of input devices (e.g. plurality of handheld or wearable consoles) 403A, 403B, 403C. The memory 402 may alternatively be a memory local to the video game console 401.

The electronic device 401 may include, e.g. a video game playing device (games console), a smart TV, a set-top box, a smartphone, laptop, personal computer (PC), USB-streaming device (e.g. Chromecast), etc. The plurality of input devices 403A, 403B, 403C are configured to send a signal to an electronic device 401.

In FIG. 4, the electronic device 401 is shown as being associated with a plurality of input devices 403A (DualShock 4 ®), 404B (PS VR® headset), 404C (PS Move® Controller). It will be appreciated that the input devices 403A, 403B, 403C shown are merely illustrative examples and that a different number of, and/or different types of input devices may be provided. The input devices are in communication with the electronic device 401 via a wired or wireless connection. In FIG. 4, the electronic device 401 is shown as comprising a communication interface 404 for receiving user commands generated at or via the user input devices. It will be further appreciated that in some examples, user command may be generated at the electronic device 401 and not necessarily with a separate, standalone input device. For example, if the electronic device 401 is e.g. a smartphone or table with a touchscreen.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the disclosure has been described with reference to specific example implementations, it will be recognised that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method for unintentional user command compensation on an input device of a games console, the method comprising:
   receiving a user command from an input source of the input device;
   determining whether the user command is an unintentional user command by inputting the user command to a trained machine leaning (ML) model that estimates whether the input source of the input device has been actuated unintentionally by:
  calculating a deviation of the user command from a predicted desired user command; and
  outputting a user-specific compensation recommendation based on the deviation;
applying a compensation action to the user command based at least in part on the user-specific compensation recommendation; and
issuing a compensated user command output based at least in part on the compensation action.

2. The computer-implemented method of claim 1, wherein the compensated user command output comprises force-feedback and/or soft-feedback.

3. The computer-implemented method of claim 2, wherein the force-feedback comprises modifying the input device by inhibiting motion of a portion of the input device in response to a user force.

4. The computer-implemented method of claim 3, wherein the motion is inhibited for a predetermined period of time.

5. The computer-implemented method of claim 3, wherein inhibiting the motion comprises increasing a resistance of the input device against a user force.

6. The computer-implemented method of claim 2, wherein the soft-feedback comprises modifying or ignoring the unintentional user command.

7. The computer-implemented method of claim 6, wherein the modifying or ignoring comprises:
  inputting the user command to the ML model;
  predicting a desired user command;
  calculating the deviation; and
  outputting the user-specific compensation recommendation based on the deviation.

8. The computer-implemented method of claim 1, further comprising receiving at least one prior user command from the input source of the input device, receiving a subsequent user command and determining the subsequent user command is an involuntary user command based on the at least one prior user command.

9. The computer-implemented method of claim 1, further comprising:
  modifying the compensation action in response to the user-specific compensation recommendation.

10. The computer-implemented method of claim 1, further comprising:
  storing the user command and the determination on a memory, the memory comprising data related to at least one user command output or at least one user command input, further comprising learning user behaviors comprising:
  one or more prior user command inputs and/or one or more prior user command outputs and/or compensated user command outputs.

11. The computer-implemented method of claim 1, further comprising:
  prior to applying the compensation action, modifying the compensation action in response to one or more prior user command outputs and/or compensated user command outputs.

12. The computer-implemented method of claim 1, further comprising a calibration step prior to receiving the user command, wherein the calibration step comprises:
  providing a predetermined calibration task to a user;
  receiving user data in response to the predetermined calibration task; and
  processing the user data to determine a baseline deviation from a threshold,
  wherein the predetermined calibration task comprises issuing user command instructions to be executed by the user.

13. The computer-implemented method of claim 12, wherein applying the compensation action to the user command comprises modifying the compensation action in response to the baseline deviation of the user command.

14. The computer-implemented method of claim 1, wherein the input device is a console configured to send a signal to an electronic device.

15. The computer-implemented method of claim 1, wherein the compensation action defines an instruction to compensate for the user command or a future user command.

16. The computer-implemented method of claim 1, wherein applying the compensation action to the user command comprises assigning a compensation value to the user command.

17. A computer program product including one or more executable instructions which, when executed by a computer, causes the computer to carry out the method of claim 1.

18. A system comprising:
  one or more memories configured to store computer-executable instructions;
  an input device;
  a display device; and
  one or more processors configured to access the one or more memories and execute the computer-executable instructions to at least perform operations comprising:
    receiving a user command from an input source of the input device;
    determining whether the user command is an unintentional user command;
    by inputting the user command to a trained machine leaning (ML) model that estimates whether the input source of the input device has been actuated unintentionally by:
    calculating a deviation of the user command from a predicted desired user command; and
    outputting a user-specific compensation recommendation based on the deviation;
  applying a compensation action to the user command based at least in part on the user-specific compensation recommendation; and
  issuing a compensated user command output based at least in part on the compensation action.

* * * * *